(12) United States Patent
Luther et al.

(10) Patent No.: US 9,459,092 B2
(45) Date of Patent: Oct. 4, 2016

(54) METHOD AND SYSTEM FOR THE AUTOMATIC OPTICAL INSPECTION OF A TREAD PROFILE OF AT LEAST ONE WHEEL OF A VEHICLE

(71) Applicant: Robert Bosch GmbH, Stuttgart (DE)

(72) Inventors: Marc Luther, Peine (DE); Klaudia Nojek, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/401,269

(22) PCT Filed: Apr. 3, 2013

(86) PCT No.: PCT/EP2013/056993
§ 371 (c)(1),
(2) Date: Nov. 14, 2014

(87) PCT Pub. No.: WO2013/170999
PCT Pub. Date: Nov. 21, 2013

(65) Prior Publication Data
US 2015/0268132 A1 Sep. 24, 2015

(30) Foreign Application Priority Data

May 16, 2012 (DE) .................. 10 2012 208 177

(51) Int. Cl.
| | |
|---|---|
| G01B 11/06 | (2006.01) |
| G01M 17/02 | (2006.01) |
| G01B 11/22 | (2006.01) |
| B60C 25/00 | (2006.01) |

(52) U.S. Cl.
CPC ............ *G01B 11/06* (2013.01); *B60C 25/007* (2013.04); *G01B 11/22* (2013.01); *G01M 17/027* (2013.01)

(58) Field of Classification Search
CPC .... G01M 1/02; B60N 2/0232; B60N 2/0276
USPC .............. 356/237.1–237.6, 239.3, 601, 631; 73/146, 146.2, 146.5, 40.7, 8, 79
See application file for complete search history.

(56) References Cited

U.S. PATENT DOCUMENTS

| | | | | |
|---|---|---|---|---|
| 5,987,978 A | * | 11/1999 | Whitehead | G01B 11/22 73/146 |
| 7,797,995 B2 | * | 9/2010 | Schafer | B60C 11/24 73/146 |
| 8,659,653 B2 | * | 2/2014 | Joly | G03B 15/03 348/E7.031 |

FOREIGN PATENT DOCUMENTS

| | | |
|---|---|---|
| DE | 18 09 459 | 6/1970 |
| DE | 195 15 949 | 11/1996 |

(Continued)

OTHER PUBLICATIONS

International Search Report for PCT/EP2013/056993, dated May 16, 2013.

*Primary Examiner* — Kara E Geisel
*Assistant Examiner* — Iyabo S Alli
(74) *Attorney, Agent, or Firm* — Norton Rose Fulbright US LLP

(57) ABSTRACT

A method for the automatic optical inspection of a tread profile of at least one wheel of a vehicle is provided, the method encompassing the following steps: Irradiating at least one section of the tread profile using radiation from at least one radiation device; detecting the radiation reflected by the tread profile using at least one radiation detection device; processing the reflected radiation using a data processing device; and outputting an analysis result regarding a two-dimensional and/or three-dimensional structure of the tread profile, i.e., for suitability for winter weather road conditions.

10 Claims, 8 Drawing Sheets

(56) References Cited

FOREIGN PATENT DOCUMENTS

| DE | 197 05 047 | 8/1998 |
| DE | 10 2009 016 498 | 10/2010 |
| DE | 10 2009 026 845 | 12/2010 |
| WO | WO 2007/059935 | 5/2007 |

* cited by examiner

METHOD AND SYSTEM FOR THE AUTOMATIC OPTICAL INSPECTION OF A TREAD PROFILE OF AT LEAST ONE WHEEL OF A VEHICLE

BACKGROUND OF THE INVENTION

1. Field of the Invention

The present invention relates to a method and a system for the automatic optical inspection of a tread profile of at least one wheel of a vehicle, especially with regard to suitability of the tread profile for winter road conditions.

2. Description of the Related Art

Methods for ascertaining the tread depth of a vehicle tire are known from the related art. These methods are usually based on triangulation or light section methods, by which the tread depth of the tire can be ascertained in at least one or more examined section(s) of the tire.

Published German patent application document DE 10 2009 016 498 A1 describes such a method, in which a section of a tire tread is irradiated in its width direction from a position below the road surface using a line-type light beam, usually laser light, and the reflection of the light beam is detected by a sensor, e.g., a camera providing two-dimensional resolution, which is likewise disposed underneath the road surface. From the image thus recorded, and with the aid of a triangulation method, it is possible to ascertain a tread depth; the method is also able to be used on multiple sections of the tire, so that information regarding the tread depth distributed across the tire can be obtained.

Published German patent application document DE 195 15 949 C2 describes a method for the surface measuring and recording of tread wear of a tire tread, in which the wheel, i.e., the tire and wheel rim, is measured separately from the vehicle. Here, too, the tire tread is illuminated by a linear or strip-type light beam and the reflection recorded by a video camera. Via a gray scale analysis or a phase shift method, the profile wear of the tread can be determined.

BRIEF SUMMARY OF THE INVENTION

Under a first aspect, the present invention provides a method for the automatic optical inspection of a tread profile of at least one wheel of a vehicle, the method encompassing the following steps: Irradiating at least one section of the tread profile using radiation from at least one radiation device; detecting the radiation reflected by the tread profile using at least one radiation detection device; processing the reflected radiation using a data processing device; and outputting an analysis result regarding a two-dimensional and/or three-dimensional structure of the tread profile with regard to suitability for winter weather road conditions.

Under a second aspect, the present invention proposes a system for the automatic optical inspection of a tread profile of at least one wheel of a vehicle, the system including the following: At least one radiation device for emitting radiation; at least one radiation detection device for detecting the radiation reflected by the tread profile; a data processing device for processing the reflected radiation; and an output device for outputting an analysis result regarding a two-dimensional and/or three-dimensional structure of the tread profile with regard to suitability for winter weather road conditions.

The advantage of the method or the system results from the fact that a tread profile of at least one vehicle wheel is automatically inspected for its suitability for winter weather road conditions, i.e., for road surfaces that are completely or partially covered by snow and/or ice, and that information regarding the suitability or non-suitability for a winter weather road surface is possibly output to the driver and/or a third person. As a result, it is possible to ascertain, for instance prior to traveling on a wintry mountain pass road, whether or not further travel using the existing tires is technically feasible, i.e., with regard to sufficient traction, based on the prevailing weather conditions.

The radiation of the at least one radiation device advantageously includes a non-coherent electromagnetic radiation, which, for instance, may lie in the visible range, but also in the infrared range. The possibility of selecting different radiation types makes it possible to inspect different characteristics, but it is also possible to combine various types of radiation in a supplementary manner.

It is preferred if the at least one radiation device irradiates the tread profile from different directions in alternation. In so doing, certain details, such as the tread depth, are able to be determined in an unambiguous manner, without any falsification by unsuitable radiation or illumination devices.

It is furthermore preferred that the step of processing the reflected radiation includes an image analysis evaluation, preferably a gray scale analysis, with which a structure of the tread profile is ascertained. In particular a tread depth is able to be ascertained quite well in the process.

It is furthermore preferred if the radiation device and/or the radiation detection device are/is essentially situated in, on or underneath the road surface. Depending on the local roadway condition, this provides the opportunity for a corresponding placement of the components or also the option for developing them in the way of a mobile system.

It is furthermore preferred that the inspection of the particular tread profile takes place on at least two wheels of a wheel axle of the vehicle, preferably on multiple wheel axles, simultaneously. This ensures a relatively reliable statement about the suitability of the tires of the entire vehicle for use in winter weather.

It is furthermore preferred that the inspection takes place while the vehicle is moving across the radiation device or the radiation detection device. This has the advantage that the wheel or wheels need not be uninstalled from the vehicle or the moving traffic flow need not be interrupted.

DETAILED DESCRIPTION OF THE INVENTION

Figure 1:
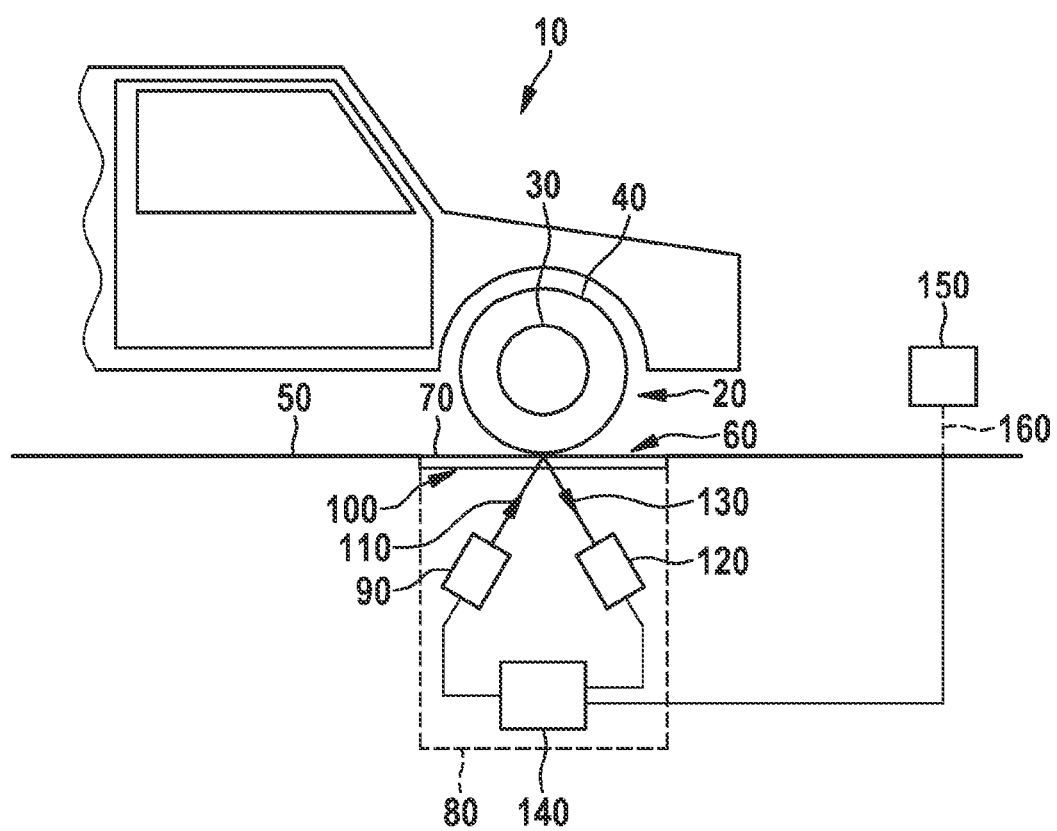
FIG. 1 shows a schematic side view of a first specific embodiment according to the present invention.

FIG. 1 shows a schematic side view of an only partially illustrated motor vehicle 10; with its front wheel 20, which is made up of wheel rim 30 and tire 40, it is driving across an opening 60 situated in a road surface 50. In the example illustrated, opening 60 is sealed by a plate 70 that is part of a housing 80, which is shown by dashed lines since it is introduced into roadway 50 and thus not visible. For better comprehension, housing 80 is illustrated using overdimensions in relation to vehicle 10 and may actually have considerably smaller proportions. Plate 70 need not have the size shown in FIG. 1 either but can also have smaller dimensions, as will be discussed in the further text.

A radiation device 90, which radiates electromagnetic radiation in the direction of tire contact patch 100 of tire 40 on plate 70, is situated inside housing 80. The radiation, sketched by an arrow 110, need not be coherent but may also lie in the IR range or in the optical range in its frequency, for example. Plate 70 is made of a material that allows the radiation to pass essentially without falsification.

In addition, a radiation detection device 120 is situated in housing 80, in such a way that the radiation reflected by tire contact patch 100 (indicated by an arrow 130) will be detected. Depending on the detected radiation, one or more signal(s) is/are transmitted to a data processing device 140 inside housing 80 and processed there as discussed further below. A result of the signal processing is transmitted to an output device 150, which is situated above roadway 50 in the illustrated example. It is also conceivable to transmit a result signal in a wireless manner, sketched by dashed line 160, to output device 150, using a transceiver (not shown here). However, another option is a transmission of the result signal to vehicle 10, so that the driver is able to be made aware of the information.

Data processing device 140 not only processes the detected signals but also controls the interaction of radiation device 90, radiation detection device 120, and output device 150. It is also conceivable that radiation device 90, radiation detection device 120, and data processing device 140 are developed in an integral fashion. For better understanding, they are shown separately in the illustrated example.

The method for the automatic optical inspection of the tread profile or tire contact patch 100 will be discussed in the further text. It should be noted at this point that the afore-described components could be situated at the beginning of a mountain pass road in order to check the tires of vehicles for their suitability for winter road conditions. The check takes place in passing, so to speak, without vehicle 10 having to stop, so that the traffic flow is not interrupted for the most part.

However, the described method for inspecting the tires is not meant to be a substitute for enforcing the legal provisions regarding the mandatory use of appropriate tires in winter weather conditions, but to provide an assessment regarding the technical suitability of the tires for corresponding weather conditions, e.g., in winter, and to inform the driver who is using tires that are unsuitable for the prevailing conditions of this state in order to avoid situations that may expose the driver to risks. In other words, it is not checked for the presence of a "snow flake symbol" or the letters "M+S" that is/are otherwise commonly used on winter tires on the side of the tire, which may be mandated by law under certain weather conditions but does not necessarily guarantee suitability under the respective weather conditions, for instance if the tread profile is worn. Apart from that, the application of these designations is at the tire manufacturers' discretion. An inspection of the tire tread as it is proposed here, on the other hand, is much more meaningful with regard to suitability under corresponding (winter) road conditions.

For this reason it is conceivable that data processing device 140 and/or output device 150 are/is also able to receive corresponding information about the current road conditions, which could be taken into account as well in the analysis of the weather-related suitability of tires, since, depending on the weather, winter tires are not necessarily required during winter or, conversely, winter tires or tires having an appropriate profile would be required in summer as well, for instance for travel on a mountain road.

Figure 2:
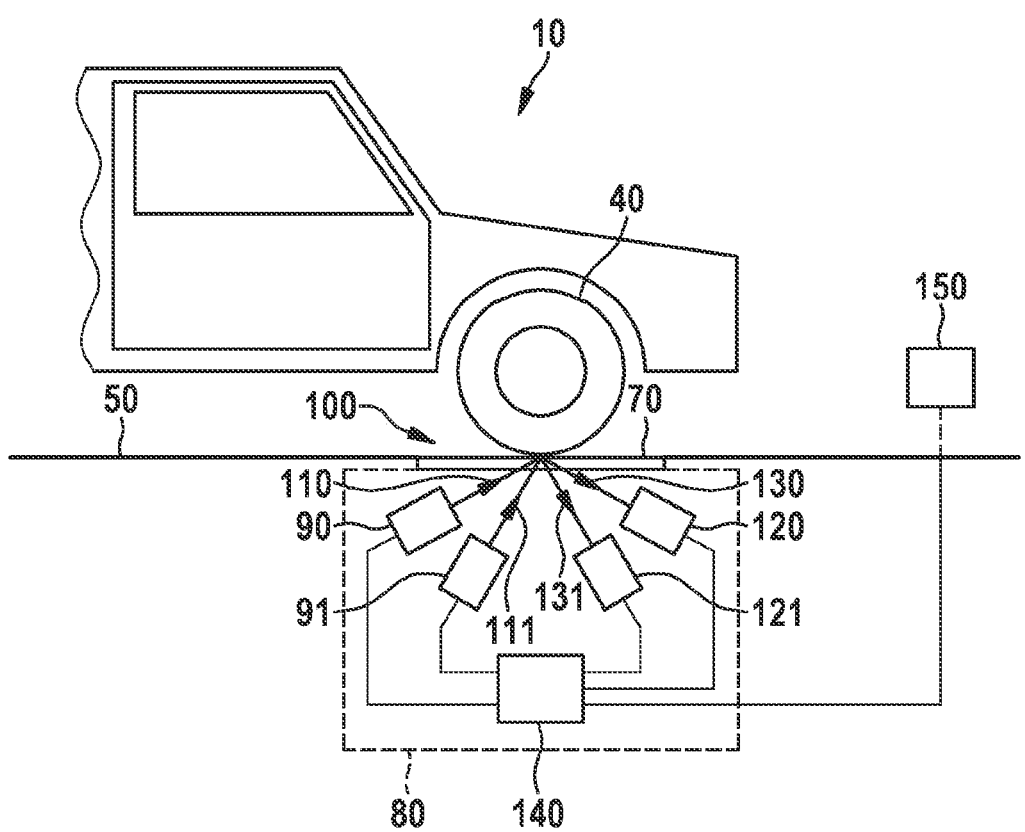
FIG. 2 shows a schematic side view of a second specific embodiment according to the present invention.

FIG. 2 shows another specific embodiment in a schematic side view. As also in the further description, identical reference numerals describe the same components.

The difference from the specific embodiment illustrated in FIG. 1 is that two radiation devices 90, 91 as well as two detection devices 120, 121 are situated in housing 80. In addition, as in the previous specific embodiment, a data processing device 140 is provided in housing 80, which is linked to radiation devices 90, 91 and detection devices 120, 121 via corresponding connecting lines.

Radiation devices 90, 91 differ in that they irradiate or illuminate tire contact patch 100 from different angles. An illumination of tire contact patch 100 from different angles may be advantageous for ascertaining the tread profile of tire 40 and for providing greater accuracy in ascertaining the profile. Detection devices 120, 121 are assigned to radiation devices 90, 91 in each case, i.e., according to the angles of reflection of reflected radiation 130, 131.

Analogous to the structure shown in FIG. 1, a plate 70, which is part of housing 80, is situated in road surface 50. Once again, plate 70 is made from a material that is transparent to radiation 110, 111 or 120, 121 and is also robust enough to allow vehicle 10 to drive across.

In addition, analogous to the structure shown in FIG. 1, data processing device 140 is linked to an output device 150, which outputs an analysis result regarding the required suitability of the tread profile. The analysis result may be output both optically and acoustically, and output device 150 may also be situated inside vehicle 10, so that it is able to be noticed by the driver.

It should be mentioned that the radiation emitted by radiation devices 90, 91 may also have different frequencies, e.g., in the IR frequency range and in the optical frequency range, depending on which characteristics of the tread profile are to be determined. The radiation may also be output separately from each other in terms of time, or they may have a temporal relationship controlled by data processing device 140, such as short time intervals from each other, for example.

However, it is also conceivable that radiation devices 90, 91 are essentially identical and, as mentioned earlier already, merely differ by the different angle in relation to tire contact patch 100 or the tread profile of tire 40.

Figure 3:
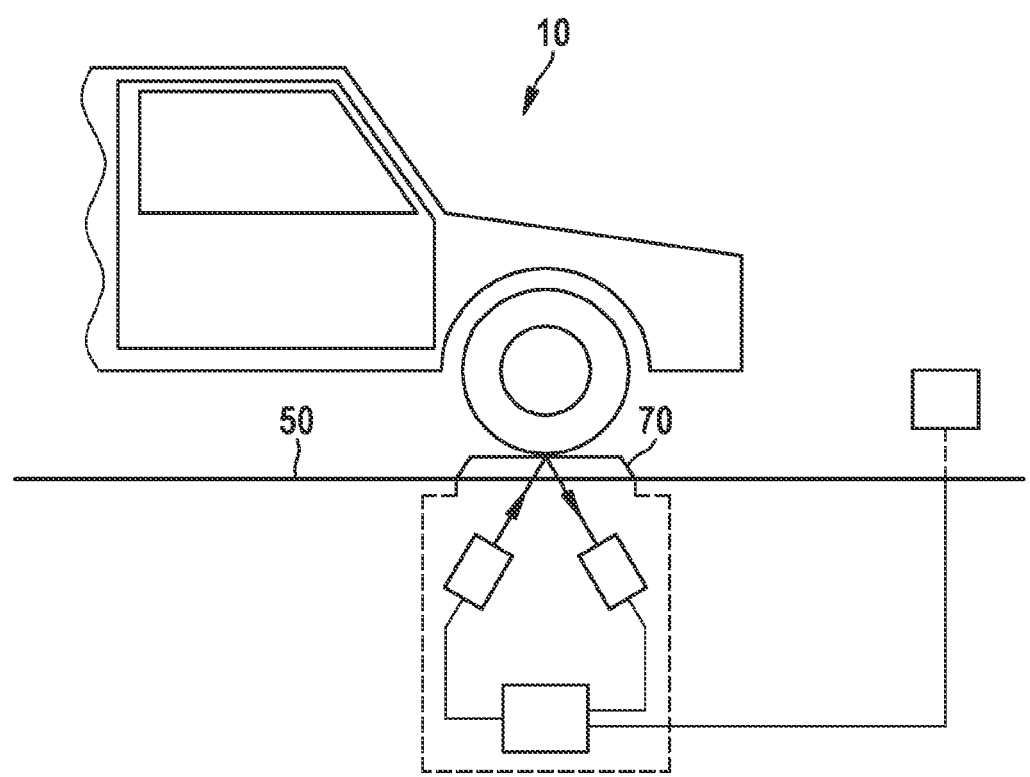
FIG. 3 shows a schematic side view of a third specific embodiment according to the present invention.

FIG. 3 illustrates another specific embodiment, which differs from the specific embodiments shown in FIGS. 1 and 2 in that plate 70 is situated on the road surface 50 in this instance, i.e., in the form of a threshold, across which vehicle 10 can drive, albeit at a reduced speed in comparison with the specific embodiments illustrated in FIGS. 1 and 2. The height of plate 70 preferably is no more than 70 mm.

Because of the height of plate 70, in this specific embodiment the driver notices that he would drive over an obstacle and reduces the driving speed accordingly.

Figure 4:
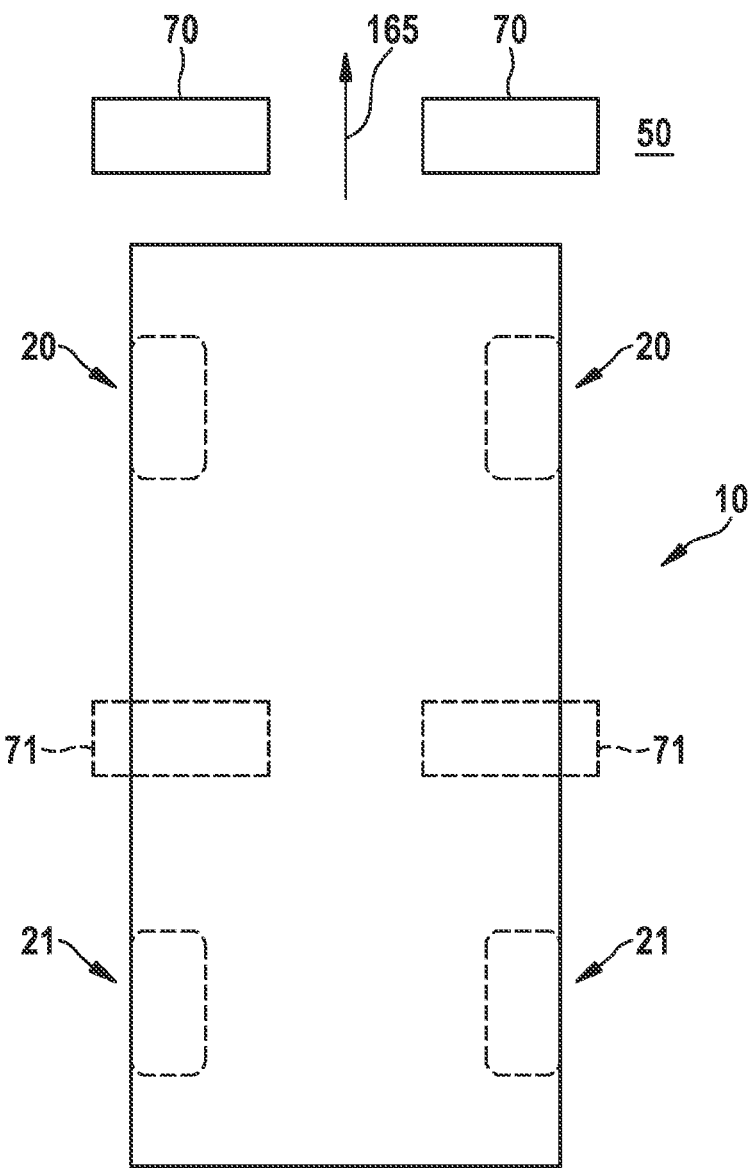
FIG. 4 shows a schematic side view of a fourth specific embodiment according to the present invention.

FIG. 4 shows a plan view of a schematically illustrated vehicle 10 having front wheels 20, 20, and rear wheels 21, 21, vehicle 10 moving in the direction of arrow 165. Also shown are two plates 70, 70 disposed in or on road surface 50, which may be designed according to the specific embodiments illustrated in FIGS. 1 through 3. Not shown are radiation devices, radiation detection devices or data processing devices situated underneath plates 70, 70 in each case.

With the aid of FIG. 4 it is to be illustrated that tread profiles of both front wheels 20, 20 are inspected simultaneously when vehicle 10 is driving across plates 70. It is obvious that plates 70, 70 are situated in such a way that rear wheels 21, 21 are inspected as well after front wheels 20, 20 have been checked when vehicle 10 is moving in the direction of arrow 165.

Optionally, it is also possible to provide plates 71, 71 (shown by dashed lines) with radiation devices, radiation detection devices and data processing devices correspondingly situated underneath, so that the tread profiles of rear wheels 21, 21 are able to be inspected together with the tread profiles of front wheels 20, 20. An illustration of a corresponding output device has been omitted.

Plates 70, 70 or 71, 71 preferably have a width of at least 700 mm, i.e., transversely to the movement direction of vehicle 10, and radiation devices or radiation detection devices situated underneath are designed in such a way that the entire width of plates 70, 70, 71, 71 is able to be utilized for the inspection. A detection width of at least 700 mm ensures that as many vehicle classes as possible are able to be covered, from small vehicles to light commercial vehicles.

In order to ensure that all tires on all vehicles to be inspected are able to be detected, guidance devices may be used to guide all vehicles across the plates or image recording devices.

Figure 5:
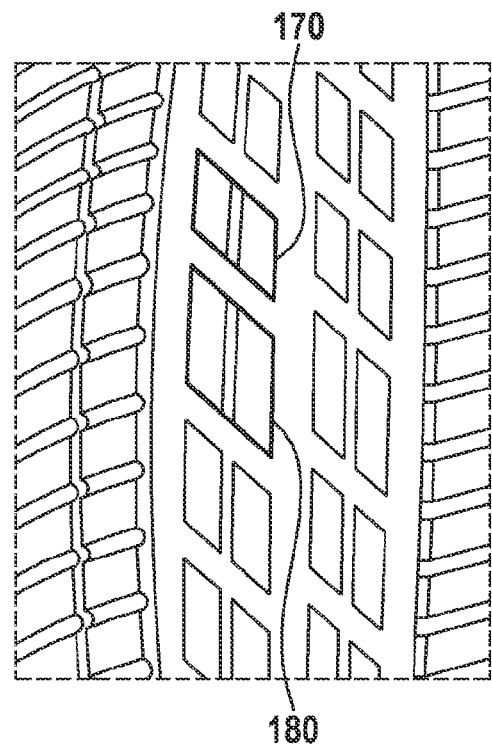
FIG. 5 shows a sectional view of a typical tread profile.

FIG. 5 schematically shows an exemplary image of a winter or all-season tire, which has been recorded by the afore-described detection or image recording devices. In particular so-called blocks can be noticed, of which two blocks 170, 180 that are outlined in bold are shown by way of example in FIG. 5. These blocks are typically present in winter or all-season tires and are meant to increase traction.

Figure 6:
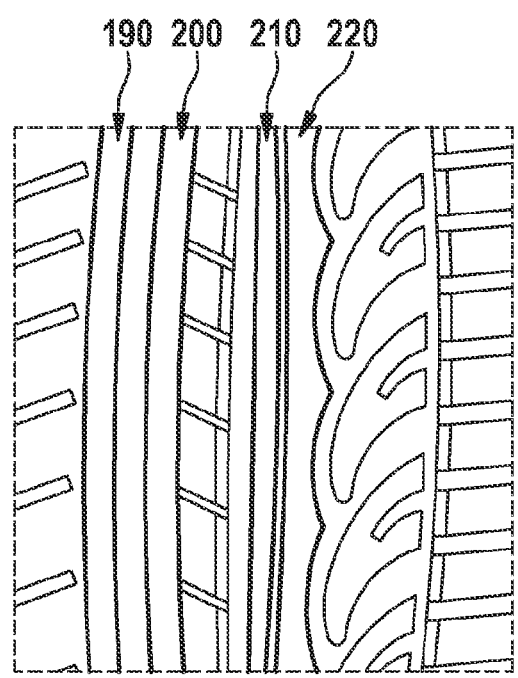
FIG. 6 shows a sectional view of a typical tread profile of a summer tire.

FIG. 6 schematically shows an image of a summer tire, which has been recorded with the aid of the afore-described detection or image recording devices. In particular continuous longitudinal structures are able to be seen, of which longitudinal structures 190, 200, 210, 220 outlined in bold are shown in FIG. 6 by way of example. These longitudinal structures are typical of summer tires and are meant to improve the lateral control and to achieve a more stable straight forward movement. These longitudinal structures are usually provided in an asymmetrical arrangement, so that a directionality of the tires comes about.

Figure 7:
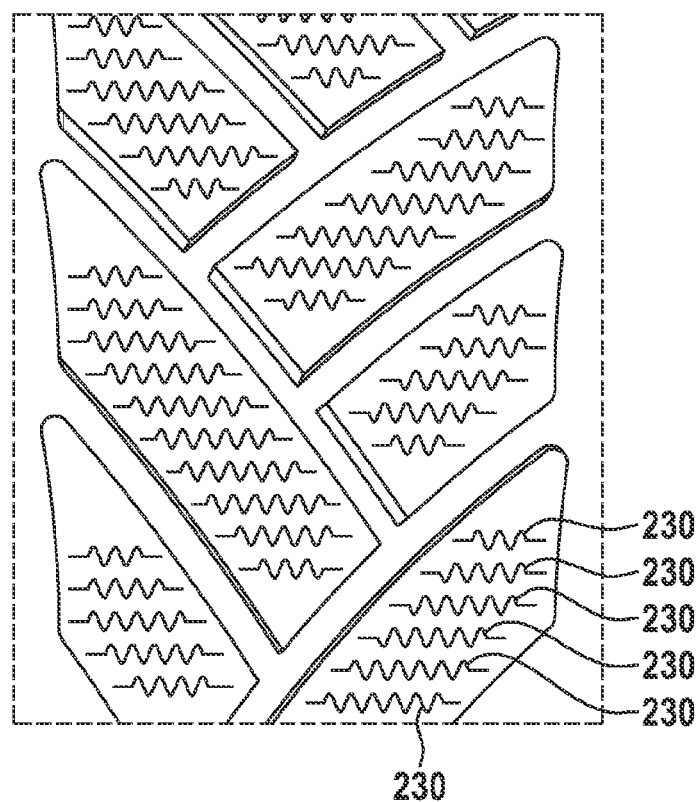
FIG. 7 shows a sectional view of a typical tread profile of a winter or all-season tire.

FIG. 7 once again schematically shows an exemplary image of a winter or all-season tire, which has been recorded by the afore-described detection or image recording devices. In contrast to FIG. 5, so-called lamellae have been provided in the blocks, which in FIG. 7 are identified for one block by reference numeral 230 by way of example. These lamellae run transversely to the rolling direction and improve the traction on snow and ice, i.e., they "claw" into the undersurface.

Figure 8A:
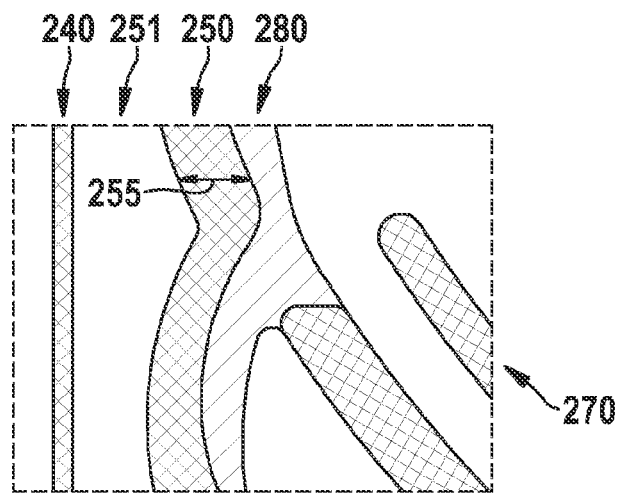
FIG. 8*a* shows a sectional view of a typical tread profile in a gray scale representation.
Figure 8B:
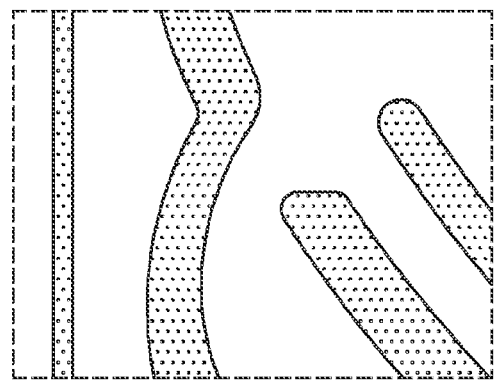
FIG. 8*b* shows the sectional view of the tread profile from FIG. 9*a* following a threshold operation.
Figure 8C:
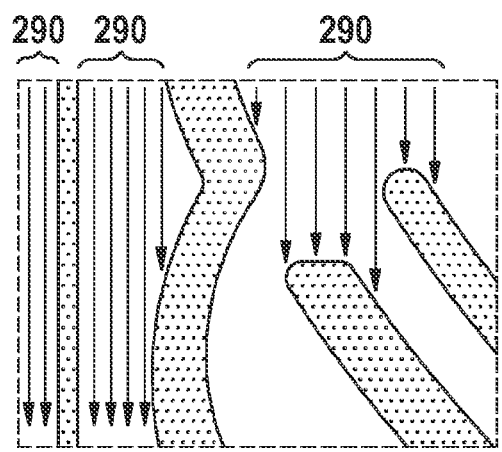
FIG. 8*c* shows the sectional view of the tread profile from FIG. 9*a* with sketched analysis characteristics.

FIGS. 8*a* to 8*c* show a cutaway of an image of a tread profile in each case, which had originally been recorded by the afore-described detection or image recording devices; FIGS. 8*a* through 8*c* illustrate views that have been modified by the data processing device and are used for inspecting the examined tread profile.

FIG. 8*a* shows a gray scale image of the tread profile, which may be utilized for measuring the tread depth. To record such an image, the illumination (or irradiation) of the tire contact patch may take place multiple times, also at different angles (see FIG. 2), in order to thereby achieve a clear cast shadow of the tread grooves, which are marked by cross-hatching and bear reference numerals 240 to 270. The width of the cast shadow represents the tread depth, to be gathered by cast shadow 250 in FIG. 8*a*, for example, the thread depth corresponding to a distance (marked by double arrow 251 in FIG. 8*a*) in the horizontal direction within the cross-hatched area, i.e., from the boundary surface of the non-hatched area 251, which corresponds to the outermost periphery of the tire, to the boundary surface of area 280 marked by simple hatching, which corresponds to the bottom of the tire, so to speak.

FIG. 8*b* shows an image of the same section from FIG. 8*a*, but following a threshold value operation performed in the data processing device. It can be noticed that details that were identified by cross-hatched areas or areas featuring simple hatching can no longer be seen, but only either white areas or dotted areas (the illustration type is randomly selectable). Tread groove 280, in particular (see FIG. 8*a*), is no longer visible. One solution would be superpositioning by one or more images featuring an illumination from different directions in each case.

FIG. 8*c* shows an image of the same section from FIG. 8*b*, but illustrates vertical arrows or paths 290, and the fact that these paths 290 are not interrupted by grooves indicates the presence of ribs, from which it is absolutely clear that an image of a summer tire tread is at hand.

Figure 9:
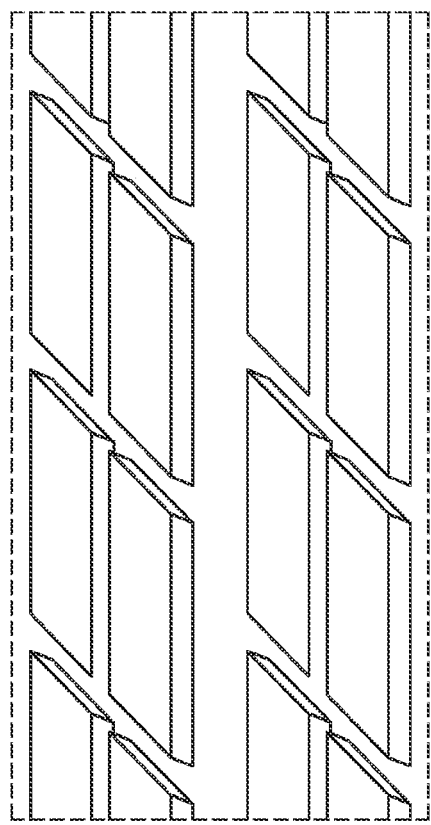
FIG. 9 shows a sectional view of a typical tread profile of a tire that is unsuitable for winter use.

Finally, FIG. 9 shows a section of an image of a tread profile in which neither ribs nor lamellae are visible, so that a clear assignment to winter or summer tires is impossible on the basis of the image. It could be a summer tire having a pure block profile, or it could be a worn winter tire where the typical lamellae are no longer present. However, in both cases the profile is no longer suitable for use in winter based on this result. Only the measurement of a sufficient tread depth could still justify its suitability for winter use.

What is claimed is:

1. A method for automatic optical inspection of a tread profile of at least one wheel of a vehicle, comprising:
    irradiating, using radiation from at least one radiation device, at least one section of the tread profile;
    detecting, using at least one radiation detection device, radiation reflected by the tread profile;
    analyzing, using a data processing device, the reflected radiation, wherein the analyzing includes:
        (a) ascertaining a two-dimensional structure of the tread profile, the two-dimensional structure including at least one of a block, a longitudinal structure, a rib, a lamella, and a tread groove of the tread profile, and
        (b) ascertaining a three-dimensional structure of the tread profile, the three-dimensional structure being tread depths;
    based on the analysis and the two-dimensional structure, selecting between a winter profile and a summer profile, and assigning the selected profile to the tread profile;

determining a suitability of the tread profile for winter road conditions based on the assignment and the three-dimensional structure; and outputting an output regarding the determined suitability of the tread profile for the winter road conditions.

2. The method as recited in claim 1, wherein the radiation from the at least one radiation device includes non-coherent electromagnetic radiation in the visible range.

3. The method as recited in claim 2, wherein the at least one radiation device irradiates the tread profile from different directions in alternation.

4. The method as recited in claim 3, wherein the tread profile is irradiated simultaneously by different radiation devices using different radiations, and wherein each of the different radiations is detected by a corresponding different radiation detection device.

5. The method as recited in claim 3, wherein the step of analyzing the reflected radiation includes a gray scale analysis by which at least one of a structure of the tread profile and a tread depth is ascertained.

6. The method as recited in claim 3, wherein at least one of the radiation device and the radiation detection device is situated one of in, on, or underneath the road surface.

7. The method as recited in claim 3, wherein the tread profiles of at least two wheels of multiple wheel axles are simultaneously inspected optically.

8. The method as recited in claim 3, wherein the automatic optical inspection takes place while the vehicle is moving across one of the radiation device or the radiation detection device.

9. A system for the automatic optical inspection of a tread profile of at least one wheel of a vehicle, comprising:
  at least one radiation device emitting radiation;
  at least one radiation detection device detecting radiation reflected by the tread profile;
  a data processing device for:
    analyzing the reflected radiation, wherein the analyzing includes:
      (a) ascertaining a two-dimensional structure of the tread profile, the two-dimensional structure including at least one of a block, a longitudinal structure, a rib, a lamella, and a tread groove of the tread profile, and
      (b) ascertaining a three-dimensional structure of the tread profile, the three-dimensional structure being tread depths:
    based on the analysis and the two-dimensional structure, selecting between a winter profile and a summer profile, and assigning the selected profile to the tread profile; and
    determining a suitability of the tread profile for winter road conditions based on the assignment and the three-dimensional structure; and
  an output device for outputting an output regarding the determined suitability of the tread profile for the winter road conditions.

10. A method for automatic optical inspection of a tread profile of at least one wheel of a vehicle, comprising:
  irradiating, using radiation from at least one radiation device, at least one section of the tread profile;
  detecting, using at least one radiation detection device, radiation reflected by the tread profile;
  analyzing, using a data processing device, the reflected radiation to ascertain (a) a two-dimensional structure of the tread profile, the two-dimensional structure including at least one of a block, a longitudinal structure, a rib, a lamella, and a tread groove of the tread profile, and (b) a three-dimensional structure of the tread profile, the three-dimensional structure being tread depths;
  determining a suitability of the tread profile for winter road conditions based on the ascertained two-dimensional structure and the ascertained three-dimensional structure; and
  outputting a result of the determination.

\* \* \* \* \*